United States Patent [19]

Vandenberg et al.

[11] Patent Number: 4,965,342
[45] Date of Patent: Oct. 23, 1990

[54] HIGH MOLECULAR WEIGHT POLYMERS AND COPOLYMERS OF 3-HYDROXYOXETANE AND DERIVATIVES THEREOF

[75] Inventors: Edwin J. Vandenberg, Fountain Hills; Jeffrey C. Mullis, Tempe, both of Ariz.

[73] Assignee: Arizona Board of Regents, acting on behalf of Arizona State University, Tempe, Ariz.

[21] Appl. No.: 419,262

[22] Filed: Oct. 10, 1989

Related U.S. Application Data

[62] Division of Ser. No. 203,262, Jun. 3, 1988.

[51] Int. Cl.$^5$ ............... C08G 65/22; C08G 65/32; C08G 65/18
[52] U.S. Cl. ................... 528/417; 528/410
[58] Field of Search .................. 528/417, 410

[56] References Cited

U.S. PATENT DOCUMENTS 3,694,383  9/1972  Azami et al. .................. 525/410
3,839,235  10/1974  Margraff ......................... 525/410

*Primary Examiner*—Harold D. Anderson
*Assistant Examiner*—T. Mosley
*Attorney, Agent, or Firm*—Richard R. Mybeck

[57] ABSTRACT

High molecular weight ($M_w > 25,000$, preferably $>50,000$; $n_{inh}$ up to 3) linear atactic poly (3-hydroxyoxetane) (PHO) are made by polymerizing the trimethylsilyl ether of 3-hydroxyoxetane with a coordination catalyst, or preferably with a cationic catalyst such as i-Bu$_3$Al-0.7 H$_2$O, followed by hydrolysis. The new polymer is atactic, highly crystalline, has a melting point of 155° C., is devoid of measurable end groups, has a two-peak $^{13}$C-NMR, and can be readily compression molded at 200° C. to a film which can be drawn at room temperature to give enhanced strength.

Isotactic high molecular weight PHO (mp=223° C.; $\Delta H_f = 25.6$ cal/g) and branched high molecular weight PHO are also prepared.

2 Claims, No Drawings

HIGH MOLECULAR WEIGHT POLYMERS AND COPOLYMERS OF 3-HYDROXYOXETANE AND DERIVATIVES THEREOF

This application is a divisional from our copending application Ser. No. 203,262 filed June 3, 1988.

INTRODUCTION

The present invention relates to new compositions of matter and methods of making the same. More particularly, the present invention relates to high molecular weight (weight average >25,000) poly (3-hydroxyoxetane), copolymers of 3-hydroxyoxetane (HO) containing at least about 50% w/w HO, and derivatives thereof. The polymers of the present invention possess unique and novel properties and characteristics which renders them of special interest and utility for a variety of important industrial applications. Some of the work herein was supported by grants from the National Science Foundation (DMR-8412792) and the U.S. Army Research Office (MIPR 117-87).

BACKGROUND OF THE INVENTION

Poly(3-hydroxyoxetane), PHO, is an interesting analog of poly(vinyl alcohol) since it can be considered to be a copolymer of vinyl alcohol and formaldehyde. This polymer was first reported in very low molecular weight form by Wojtowicz et al (See: *J. Org. Chem.*, 38, 2061 (1973) having been obtained from the spontaneous polymerization of 3-hydroxyoxetane, HO, although its structure was not established and no apparent utility existed for the reported substance. More recently, Vandenberg (See: *J. Polym. Sci., Polym. Chem Ed.*, 23, 915 (1985) reported the preparation of low molecular weight branched PHO by a new base-catalyzed, rearrangement polymerization of glycidol and its trimethylsilyl ether. Further, using a pure enantiomer of glycidol, Vandenberg (supra) prepared low molecular weight, branched, isotactic PHO.

The present invention represents a further advance that it creates useful high molecular weight atactic and isotactic polymers of HO. As used herein, "Mw" means weight average molecular weight and "Mn" is number average molecular weight.

In the course of the work hereunder it was determined that the Wojtowicz et al spontaneous polymer was linear, low molecular weight (i.e., Mn<2000, $n_{inh}$ of 0.05 or less), atactic, poly(3-hydroxyoxetane) (PHO) of high crystallinity and which after long storage at room temperature had —OCH$_2$CH(OH)CH$_2$OH end units. Spontaneous PHO apparently is formed by a cationic polymerization of HO by the carboxylic acids produced by the air oxidation of HO on standing at room temperature for several months. This polymerization can be duplicated by adding either 1–2% acetic acid or hydroxyacetic acid to HO.

BRIEF SUMMARY OF THE INVENTION

The present invention relates to high molecular weight (average Mw>25,000 and preferably >50,000) poly (3-hydroxyoxetane), copolymers of 3-hydroxyoxetane, HO, containing at least about 50 percent HO, preferably at least about 80 percent HO, and derivatives thereof. The polymers are prepared by polymerization with coordination catalysts such as R$_3$Al-x H$_2$O-y (chelating agent), wherein x=0.1 to 1.5 and y=0.01 to 2.0, and certain preferred cationic catalysts such as R$_3$Al-x H$_2$O, wherein x=0.1 to 1.5.

In a preferred practice of the present invention, high molecular weight, linear, atactic, water soluble, and highly crystalline PHO (mp=155° C.) is prepared by polymerizing the trimethylsilyl ether of HO with the i-Bu$_3$Al-0.7 H$_2$O cationic catalyst followed by hydrolysis. Two $^1$H-NMR methods for measuring the tacticity of PHO were developed based on the identification of two different types of methylene units at 400 MHz with the methine protons decoupled. Also, a third $^1$H-NMR method was developed for measuring branching in HO polymers. High molecular weight PHO, linear and isotactic, was obtained in low yield as a water-insoluble fraction with T$_m$=223° C. These new isotactic and atactic high molecular weight polymers decidedly contrast with the low molecular weight highly branched PHO prepared by the base-catalyzed polymerization of glycidol.

Accordingly, a prime object of the present invention is to provide a new high molecular weight, branched, water soluble polymer of 3-hydroxyoxetane containing at least 50% HO; and methods of preparing and characterizing such polymers.

Another object of the present invention is to provide a high molecular weight, e.g., average Mw>25,000, preferably greater than 50,000, poly (3-hydroxyoxetane), copolymers of 3-hydroxyoxetane containing at least 50% w/w HO and preferably at least 80% HO, and derivatives thereof.

These and still further objects as shall hereinafter appear are fulfilled by the present invention in a remarkably unexpected fashion as can be readily discerned from a careful consideration of the detailed description of exemplary embodiments thereof appearing hereafter.

DESCRIPTION OF PREFERRED EMBODIMENTS

The polymers and copolymers of 3-hydroxyoxetane and derivatives thereof which constitute the present invention have a general formula:

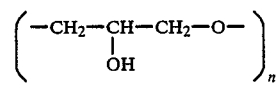

wherein n is >340, preferably >675.

The polymers and copolymers are obtained in a nitrogen environment by tumbling 3-(trimethylsilyloxy)oxetane in toluene for a period of about 24 hours in the presence of a catalyst such as i-Bu$_3$Al-0.7 H$_2$O in n-heptane at a temperature of from about −78° to about +50° C. or Et$_3$Al-0.5 H$_2$O-0.5 acetylacetone (Chelate Catalyst) at a temperature of from about 0° to about 150° C., or the like.

Other suitable catalysts which may be used in the practice of the present invention to produce the new polyether copolymers include catalysts formed by reacting an organoaluminum compound with from about 0.1 mole to about 1.5 moles of water per mole of organoaluminum compound. The new polyether copolymers of this invention may also be prepared by contacting a mixture of monomers as set forth above with a catalyst formed by reacting an organoaluminum compound with from about 0.01 mole to about 2 moles of chelating agent such as acetylacetone, trifluoroacetylacetone, ethoxyacetic acid, etc., and with from about 0.1 mole to about 1.5 moles of water per mole of organoaluminum compound. Exemplary of organoaluminum compounds which may be so reacted with water, or with a chelating agent and with water and used as the catalyst are triethylaluminum, tripropylaluminum, triisobutylaluminum, trioctylaluminum, diethylaluminum hydride, diisobutylaluminum hydride, and the like. A typical catalyst of the first type for the purposes of this invention is the product obtained by reacting 1 mole of triisobutylaluminum with 0.5 mole of water. A typical catalyst of the second type is the product obtained by reacting 1 mole of triethylaluminum with 1 mole of acetylacetone and with 0.5 mole of water in either order.

As shown, the polymerizations of the present invention are run either under nitrogen in capped tubes with self-sealing, rubber-lined caps (Buna N or butyl rubber) or in reaction vessels fitted with silicone rubber/PTFE (polytetrafluoroethylene) seals using the general procedure described by Vandenberg (See: *Macromolecular Synthesis*, W. J. Bailey, Ed., Wiley, N.Y. 1972, Vol 4, p. 52, Note 6) except that nitrogen sparging of the closed vessel for at least 20 minutes is used to remove air. Reagents are added via syringe or cannulae. All solvents used for polymerizations are deoxygenated with a stream of nitrogen for at least 20 minutes. The reaction containers are either tumbled in a constant temperature bath, stirred with a Teflon ®-coated magnetic stirring bar, or placed in a bath (e.g., at $-78°$ C.) with periodic shaking as needed. Runs are usually shortstopped with anhydrous ethanol (5 ml/10 ml monomer). Polymerization data are reported on a 10 ml monomer basis, although the runs are usually made with 2.0 ml of monomer in small tubes. Other polymerization details such as reaction times, unusual catalyst preparation conditions, and the like appear below.

In one practice of the present invention, high molecular weight linear PHO, prepared from the polymerization of 3-(trimethylsilyloxy) oxetane (10 ml basis), to poly[3-(trimethylsilyloxy)oxetane] using the catalysts shown in Examples I-X below and conditions shown in Table I, was then hydrolyzed to PHO by tumbling at 65° C. in 200 ml of toluene and 300 ml of 1 M HCl for about 24 hours. The toluene was evaporated under a stream of nitrogen or via aspirator vacuum and the resulting aqueous solution dialyzed neutral using 2000 molecular weight cut-off dialysis tubing. The resulting solution was freeze-dried in vacuo ($<0.1$ mm Hg). $^{13}$C-NMR is a simple two peak spectra for the $CH_2$ and CH chain carbons and confirms that the polymer is high molecular weight with no detectable end groups such as are found in large amounts in the prior art polymers.

High molecular weight branched PHO was also synthesized using the present invention (See: Example XIV, infra) and useful product was obtained.

The polymerization of the present invention can be run with or without diluent. Diluents and/or solvents used in polymerizations and syntheses of the high molecular weight polymers of the present invention include toluene, DMSO, n-heptane, diethyl ether, $CH_2Cl_2$ and the like. All of the solvents will be chemically pure ("C.P."), or high purity materials which were dried over molecular sieves before use. In any event, these solvents must be free of reactive materials which destroy the catalyst. The triisobutylaluminum and triethylaluminum were dissolved in n-heptane or n-hexane (0.9 M and 1.5 M, respectively). Dialysis tubing (2000 molecular weight cut-off) was generally conditioned by soaking several hours in distilled water before using. S-Glycidol in 90% enantiomeric excess ("ee") and 99% chemically pure. A 2:1 mixture of trifluoroacetic acid-d:trifluoroacetic anhydride was made by adding $D_2O$ to trifluoroacetic anhydride. The resulting mixture contained a small unknown impurity at $4.01\sigma$ as did the trifluoroacetic acid-d.

3-Hydroxyoxetane (HO), made by the procedure described by K. Baum et al (See: *J. Org. Chem.* 48, 2953 (1983)), was found to be only 95% pure, based on $^1$H-NMR. In order to prepare pure HO for use herewith, it was necessary to make the trimethylsilylether of the crude HO, purify it by distillation, and then desilylate it as will now be described.

3-(trimethylsilyloxy)oxetane was prepared by placing a mixture of 3-hydroxyoxetane (59.5 g, 0.80 mol in 150 ml of anhydrous ether into a 2 L round bottomed flask. To this mixture, bis(trimethylsilyl)acetamide (109 g, 0.54 mol) in 133 ml of ether was added over a period of 1.5 hours. The mixture was stirred for 8 hours more after which 25 ml of anhydrous ethanol was added to remove traces of excess bis(trimethylsilyl) acetamide. After stirring overnight, the mixture was filtered and the ether was removed from the filtrate by distillation. The mixture was then diluted with 150 ml of low boiling petroleum ether, filtered through basic alumina and distilled through a 1 meter packed column at 5.5 mm Hg. (bp 37°, 32.8 g, $\geq 99.5\%$ pure by $^1$H-NMR). A second less pure fraction (34.0 g) of 3-(trimethylsilyloxy)oxetane, distilled at a slightly higher bp, was found to be 99% pure by $^1$H-NMR. $^1$H-NMR ($CDCl_3$), $\sigma$:4.83(pentet, J=6.0 Hz), 4.70(t,J=6.0 Hz), 4.55(t,J=6.0 Hx), 0.077(s).

Among the comonomers which can be successfully employed in the practice of the present invention are tetrahydrofuran ("THF") and substituted tetrahydrofurans in which the substituent is selected from the group consisting of alkyl having from 1 to 7 carbon atoms; aryl having from 6 to 15 carbon atoms; hydroxyalkyl having from one to seven carbon atoms; haloalky having from one to seven carbon atoms; and halogen. Examples of such substituted THFs include: 2-methyl-THF; 3-methyl-THF; 2,2-dimethyl-THF; 3,3-dimethyl-THF; 2-phenyl-THF; 3-phenyl-THF; 2-chloro-THF; 3-chloro-THF; 2-chloromethyl-THF; 3-chloromethyl-THF; 3,3-bis(chloromethyl)THF; the trimethylsilyl ether of 2-hydroxymethyl THF and the like. Of the foregoing, polymers made with THF as the comonomer are preferred.

Other monomers which can be successfully employed in the practice of this invention include those having an epoxy group, that is, an oxirane or oxetane ring which are herein referred to as "oxiranes" and "oxetanes", respectively. Exemplary of the oxiranes useful herewith are the alkylene oxides such as ethylene oxide, 1,2-propylene oxide, butene oxides (butene-1-oxide and the cis- and trans-butene-2-oxides), isobutylene oxide; substituted alkylene oxides such as epichlorohydrin, epibromohydrin, epifluorohydrin, methallyl chloride epoxide, trifluoromethylethylene oxide, perfluoropropylene oxide, perfluoroethylene oxide, vinyl chloride epoxide, dichloroisobutylene epoxide, and the like; cycloaliphatic epoxides such as cyclohexene oxide, vinyl cyclohexene monoxide, vinyl cyclohexene dioxide, $\alpha$-pinene epoxide, dipentene epoxide, and the like; epoxy ethers such as alkyl glycidyl ethers, such, for example, as methyl glycidyl ether, ethyl glycidyl ether, isopropyl glycidyl ether, isobutyl glycidyl ether, tertbutyl glycidyl ether, n-hexyl glycidyl ether, n-octyl glycidyl ether, and the like; phenyl glycidyl ether, chlorophenyl glycidyl ethers, nitrophenyl glycidyl ethers, alkylphenyl glycidyl ethers chloroalkyl glycidyl ethers, such as chloroethyl glycidyl ether; unsaturated glycidyl ethers such as vinyl glycidyl ether, allyl glycidyl ether, σ-allyphenyl glycidyl ether, and the like; glycidyl esters such as glycidyl acetate, glycidyl propionate, glycidyl pivalate, glycidyl methacrylate, glycidyl acrylate, glycidyl oleate, glycidyl resinate, and the like; alkyl glycidates such as methyl glycidate, ethyl glycidate, and the like; and other epoxides, such, for example, as styrene oxide, α-methylstyrene oxide, butadiene monoxide, butadiene dioxide, epoxy stearates, 1-dimethylamino -2,3-epoxy propane, trimethyl-2,3-epoxypropyl ammonium chloride, and the like. Particularly useful are ethylene oxide and its mono-substituted derivatives such as propylene oxide, epihalohydrins, and the like and the oxiranes containing hydroxyalkyl groups in which the active hydrogen is replaced with a non-reactive, easily removable group such as trialkylsilyl. Especially preferred are the trimethylsilyl ethers of glycidol, 1,1-bis(hydroxymethyl)ethylene oxide, cis- and trans-1,4-dihydroxy-2,3-epoxy butane, and the like.

The oxetanes which can be copolymerized herein are characterized by the structural formula:

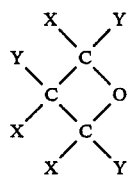

wherein each X and each Y substituent is any group which does not react with the catalyst, such, for example, as free hydroxyl, primary amino, or secondary amino group except where the reactive hydrogens in such groups are replaced with a non-reactive, easily-replaceable group, such as trialkylsilyl, they can also be used in the practice hereof. By way of further example, suitable X and Y substituents include: hydrogen; halogens including fluoro, chloro, bromo, and iodo substituent groups; alkyl, cycloalkyl, aryl, and aralkyl groups such as methyl, ethyl, propyl, butyl, cyclohexyl, phenyl, tolyl, benzyl, and the like; nitroalkyl such as nitromethyl, nitro-ethyl, and the like; nitratoalkyl such as nitratomethyl, nitratoethyl, and the like; cyanoalkyl such as cyanomethyl, cyanoethyl, and the like; alkoxy, aryloxy, aralkoxy, such as methoxy, ethoxy, phenoxy, and the like; alkyl-, cycloalkyl-, aryl-, and aralkyloxymethyl groups such as methoxymethyl, ethoxymethyl, phenoxymethyl, benzyloxymethyl, and the like; acyloxyalkyl groups such as acetoxymethyl, acetoxyethyl, benzoxymethyl, and the like; haloalkyl groups such as chloromethyl, bromoethyl, iodomethyl, fluoromethyl, chloroethyl, chloropropyl, and the like; tertiary aminoalkyl groups such as dimethylaminomethyl, dimethylaminoethyl, and the like; acylamidoalkyl groups such as acetamidomethyl, sulfonamidomethyl, and the like; ethylenically unsaturated aliphatic radicals such as vinyl, propenyl, isopropenyl, allyl, methallyl, butenyl, allyloxymethyl, propenyloxymethyl, methallyloxymethyl, oleyl, and the like; and cycloalkyl or aryl radicals containing an ethylenically unsaturated substituent and cycloalkyl radicals containing an ethylenic double bond in the ring, as, for example, 4-vinylcyclohexyl, α-terpinyl, terpinyl, abietyl, cyclohexenyl-methyl, o-allylphenyl, p-vinylbenzyl, and the like. Illustrative of typical oxetanes which the comonomer can comprise include oxetane, 2-bromo oxetane, 2-methyl oxetane, 2-cyclohexyl oxetane, 2-benzyl oxetane, 2-nitropropyl oxetane, 2-cyanoethyl oxetane, 2-methoxy oxetane, 2-phenoxy oxetane, 2-methoxyethyl oxetane, 2-benzyloxymethyl oxetane, 2-allyl oxetane, 2-vinylbenzyl oxetane, 2-chloromethyl oxetane, and the like; 2,2-bis (chloromethyl) oxetane, 2,2-bis(2-chloroethyl) oxetane, 2,2-dimethyl oxetane, 2-chloro-2-methyl oxetane, 2-fluoro-2-bromomethyl oxetane, 2,2-bis(nitratomethyl) oxetane, 2-methoxy-2-methyl oxetane, 2-carbomethoxy-2-chloromethyl oxetane, 2-methallyl-2-methyl oxetane, and the like; 2-vinyl-3,3-bis(chloromethyl) oxetane, 2-methoxy-3,3-bis(bromomethyl) oxetane, 2-vinylbenzyl-3,3-dimethyl oxetane, 2-allyloxymethyl-3-chloromethyl-3-ethyl oxetane, 2-phenoxymethyl-3-fluoro-3-methyl oxetane, and the like; 2-methyl-3,3-bis(-chloromethyl)-4-methyl oxetane, 2-vinyl-3,3-bis(iodomethyl)-4-methoxy oxetane, 2-chloromethyl-3,3-dimethyl-4- chloromethyl oxetane, 2-chloro-3-ethyl-3-methoxymethyl-4-(o-allylphenyl) oxetane, 2-ethyl-3,3-bis(phenoxymethyl)-4-allyl oxetane, and the like; 2-methyl-3-methyl oxetane, 2-chloromethyl-3-bromo oxetane, 2-methoxy-3-butenyl oxetane, 2-methallyloxymethyl-3-ethyl oxetane, 2-propenyl-3-bromoethyl oxetane, 2-methoxymethyl-3-propyl oxetane, and the like; 3-chloro oxetane, 3-ethyl oxetane, 3-cyclohexyl oxetane, 3-phenyl oxetane, 3-methoxy oxetane, 3-allyl oxetane, 3-chloromethyl oxetane, 3-vinyl oxetane, and the like; 3,3-bis(chloromethyl) oxetane, 3,3-bis(-bromomethyl) oxetane, 3,3-bis(iodomethyl) oxetane, 3,3-bis(fluoromethyl) oxetane, 3,3-bis(2-chloroethyl) oxetane, 3-bromomethyl-3-choromethyl oxetane, 3,3-dimethyl oxetane, 3,3-diethyl oxetane, 3,3-bis(chloro) oxetane, 3,3-bis(bromo) oxetane, 3-chloro-3-chloromethyl oxetane, 3-bromo-3-ethyl oxetane, 3-fluoro-3-bromomethyl oxetane, 3-fluoro-3-chloro oxetane, 3-ethyl-3-methyl oxetane, 3-chloromethyl-3-ethyl oxetane, 3-chloromethyl-3-methyl oxetane, 3,3-bis (cyanomethyl) oxetane, 3,3-bis(nitratomethyl) oxetane, 3-chloromethyl-3-nitromethyl oxetane, 3-methoxy-3-methyl oxetane, 3-ethyl-3-methoxymethyl oxetane, 3-ethoxymethyl-3-methyl oxetane, 3-carbomethoxy-3-chloromethyl oxetane, 3,3-bis (phenoxymethyl) oxetane, 3-vinyl-3-methyl oxetane, 3-allyl-3-chloromethyl oxetane, 3-isopropenyl-3-ethyl oxetane, 3-chloromethyl-3-(4-vinylcyclohexyl) oxetane, 3-methyl-3-methally oxetane, 3,3-bis(allyl) oxetane, and the like; 2-methyl-3-methyl-4-methyl oxetane, 2-ethyl-3-chloromethyl-4-ethyl oxetane, 2-chloromethyl-3-vinyl-4-chloromethyl oxetane, 2-methoxy-3-bromo-4-methyl oxetane, 2-allyl-3-methoxy-4-carbomethoxy oxetane, and the like; 2-methyl-4-methyl oxetane, 2-vinyl-4-chloroethyl oxetane, 2-chloro-4-allyl oxetane, 2-methoxy-4-ethyl oxetane, 2-chloromethyl-4-chloromethyl oxetane, 2-chloromethyl-4-cyanomethyl oxetane, the trimethylsilyl ether of 3,3-bis(hydroxymethyl)oxetane, the trimethylsilyl ether of 3-methyl-3(hydroxymethyl)oxetane, and the like. Moreover, mixtures of two or more of any of the above oxiranes or oxetanes can be used as the comonomer component whenever it is desired, as, for example, to modify the properties of the end product.

Reverting back to catalyst preparation, the i-Bu₃Al-0.7 H₂O in n-heptane, the Et₃Al-0.5 H₂O-0.5 AA (AA=acetylacetone) "chelate" catalyst, Et₂Zn-0.9 H₂O, and Et$_3$Al-0.5 H$_2$O-0.5 AA-X alcohol (or binapthol) catalysts, as prepared by Vandenberg (See: *J. Polym. Sci., Polym. Chem. Ed.*, 7, 525 (1969) and U.S. Pat. No. 3,639,267) are also useful in the practice of this invention.

In the characterization of the polymers produced hereby, inherent viscosities were determined at 0.1% in H$_2$O at 30° C.

Differential scanning calorimeter (DSC) analyses were used to characterize the melting behavior of the polymers. A DuPont thermoanalyzer connected to a 910DSC vented cell was heated at 10° C./minute heating rate up to about 200° C. for the first heat, cooled at about 50° C./minute to ambient or lower temperature, and then immediately heated a second time. This procedure is similar to that given by ASTM Method D 3418-75.

$^1$H-NMR and $^{13}$C-NMR were run at 400 MHz and 100.6 MHz, respectively, on a Brucker AM-400. Chemical shift data are relative to the proton impurity peaks in CDCl3 or DMSO-d6. In trifluoroacetic acid-d and D$_2$O, the data are relative to the sodium salt of 3-(trimethylsilyl)propanoic-2,2,3,3-d$_4$ acid (TSP-d$_4$) or, in a few cases, the sodium salt of 3-(trimethylsilyl)-1-propanesulfonic acid (DSS).

The determination of end groups in low molecular weight PHO is based on the finding that different hydroxyl groups are distinguishable in the $^1$H-NMR spectra in DMSO-d6, presumably because of strong hydrogen bonding between the hydroxyls and DMSO. In the Wojtowicz et al low molecular weight PHO, the main chain hydroxyl is at $\sigma$4.75 and the end group hydroxyls are at $\sigma$4.60 (d, J=4.84) and $\sigma$4.46 (t, J-5.70). The end group content is then determined from the hydroxyl end-group peak area relative to the main chain peak area.

Detection of stereoregularity of 3-substituted poly(oxetanes) by $^{13}$C-NMR has previously been shown to be difficult owing to the fact that the pseudo asymetric centers are separated by four bonds. (See: E. Riande et al, *Macromolecules*, 17, 1431 (1984)). $^{13}$C-NMR of atactic poly(3-methyloxetane) in CDCl$_3$ does not show tacticity peaks for the methine carbon unless the spectra is enhanced and then three unresolved peaks are found with a difference in chemical shift of only 0.017 ppm for the three triads. PHO in D$_2$O, however, shows no such splitting even when the spectra is resolution enhanced by a Lorentz-Gauss multiplication of the free induction decay (FID) as was done previously for poly(3-methyloxetane). (See: Riande et al, supra.) Dissolution of PHO at 1% concentration in 2:1 (V:V) H$_2$O:CH$_3$OH, however, narrows the line width of the methine resonance enough to make tacticity splitting detectable in resolution enhanced spectra. Such spectra exhibit three unresolved lines separated from each other by 0.018 ppm, similar to that for poly(3-methyloxetane).

Since the small separation of the three resonances prohibit accurate determination of the three triads, a better method was sought for determining the stereoregularity of PHO. It was found that while the $^1$H-NMR of PHO in D$_2$O is too complex to be useful, decoupling of the methine protons at at $\sigma$4.04 caused the methylene complex centered at 3.60$\sigma$ to collapse to six lines. These were assumed to be caused by the overlapping of two AB quartets centered at 3.65, 3.54 $\sigma$ and 3.62, 3.57$\sigma$. This interpretation was confirmed by a similar CH-decoupled spectra obtained from isotactic PHO which exhibited only the outer AB quartet attributed to the isotactic methylene dyad. A J-resolved spectra obtained in D$_2$O showed only four main lines indicating four different types of protons.

The best resolved line for each type of dyad was used to calculate the % isotactic for water soluble PHO as described below.

Tacticity determinations in D$_2$O are based on the $^1$H-NMR shown in FIG. 1 and were conducted as follows: The ratio of the isotactic and syndiotactic dyads was calculated by integrating lines 1i and 2s as follows:

$$\text{isotactic:syndiotactic} = \frac{1i + 2i}{1s + 2s},$$

or in terms of 1i and 2s:

$$\text{isotactic:syndiotactic} = \frac{1i + (1i)(r_i)}{2s + (2s)(r_s)^{-1}}$$

(where $r_i$ is the ratio of intensity of the inner and outer line of the isotactic AB quartet and $r_s$ has analogous meaning for the syndiotactic dyad)

$$\text{using } r = \frac{\gamma_1 - \gamma_4}{\gamma_2 - \gamma_3}$$

$$\text{isotactic:syndiotactic} = \frac{1i + 1i\left(\frac{\gamma_{1i} - \gamma_{4i}}{\gamma_{2i} - \gamma_{3i}}\right)}{2s + 2s\left(\frac{\gamma_{2s} - \gamma_{3s}}{\gamma_{1s} - \gamma_{4s}}\right)}$$

The frequencies in this case are:

$$\gamma_{1s} - \gamma_{4s} = \gamma_{2i} - \gamma_{3i} = 31.6 \text{ Hz}$$
$$\gamma_{1i} - \gamma_{4i} = 51.8 \text{ Hz}$$
$$\gamma_{2s} - \gamma_{3s} = 8.0 \text{ Hz}$$

$$\text{thus, isotactic:syndiotactic} = \frac{1i}{2s}(2.11)$$

$$\text{or } \frac{\% \text{ isotactic}}{100} = \frac{\frac{1i}{2s}(2.11)}{1 + \frac{1i}{2s}(2.11)} \quad 100 = \frac{1i(2.11)}{2s + 1i(2.11)}$$

A similar method utilizing CH decoupled $^1$H-NMR in 2:1 trifluoroacetic acid-d:trifluoroacetic anhydride was used to determine the percent isotactic for water insoluble PHO and is also described below.

Tacticity determinations were also performed in a 2:1 mixture of trifluoroacetic acid-d: trifluoroacetic anhydride using $^1$H-NMR for measurements. Samples were prepared by dissolving about 5 mg of PHO in about 1 ml of solvent. The mixture was then allowed to stand for at least 6 hours after which the peak at $\sigma$4.2-4.3 due to unesterified methine was no longer detectable. Irradiation of the methine protons at $\sigma$5.44 caused the methylene protons at $\sigma$3.8-3.9 to collapse into the five line pattern. Transformation of the FID, using a Gaussian function revealed the five line pattern to be due to two poorly resolved AB quartets with $\sigma$3.89, 3.83 for the outer AB quartet and $\sigma$3.88 and 3.85 for the inner one. This outer AB quartet is, in fact, due to the syndiotactic methylene protons as hereinafter described. Using $\gamma_{1s}$-$\gamma_{4s}$=38.0 Hz and $\gamma_{2s}$-$\gamma_{3s}$=15.4 H$_z$ for the outer AB quartet gives $r_s=2.47$ where $r_s$ and $\gamma_s$ are defined as above.

$$\text{Thus: } \frac{\text{syndiotactic}}{\text{total}} = \frac{2[(4s) + 2.47(4s)]}{\text{total}}$$

where 4s is the intensity of the highest field line of the syndiotactic AB quartet or $$\% \text{ syndiotactic} = 4s \frac{6.94}{\text{total}} \, 100$$

The assignment of the isotactic dyads could not be carried out using the isotactic branched PHO since its branched structure and low molecular weight caused a complex spectra which could not be reliably analyzed. Therefore, in order to confirm the assignment shown above, a small 100° C. water soluble fraction, known to be 61% isotactic from determination in $D_2O$, was run in this method. Using the above equation gives a value of 63% isotactic which is within experimental error of the previous result in $D_2O$.

The copolymer of 3-hydroxyoxetane (HO) can be produced with other oxetanes or the oxiranes which contain at least 50% HO w/w, preferably at least 80% HO w/w, and more preferably, at least 90% HO w/w. The copolymers can be either amorphous or crystalline and may be either water soluble or water insoluble, depending on the copolymer produced. The same catalysts and operating conditions described above will apply to the preparation of the copolymers. Caution should be taken to assure that monomers containing hydroxyl groups are pretreated to block the hydroxyl groups before commencing polymerization as described above vis-a-vis HO.

Anticipated uses of the polymers herein described include use as cross-linked hydrophilic fibers, films, oxygen barrier resins, binders, coatings, textile sizings, detergent additives, coagulants, water thickeners, dispersing agents, contact lenses, intraocular lenses, prostheses, and uses heretofore associated with poly(vinyl alcohol).

The crystalline, hydroxyl-containing polyethers produced by the present invention are high melting polymers which have excellent physical properties and are readily converted into fibers of superior properties by melt or solution spinning techniques using conventional orientation methods.

The amorphous copolymers of this invention which are water soluble are particularly useful as thickeners, protective colloids, oil well drilling additives, starch modifiers, adhesives, binders, textile sizes, detergent additives, coagulants, and the like.

The products of this invention can also contain stabilizers such as ultraviolet light absorbers, antioxidants, particularly of the phenolic or aromatic amine type, antacids, and the like, as well as other additives such as plasticizers, fillers, as, for example, silica, asbestos, clay, carbon black, reactive silanes, and the like.

PHO and its copolymers can be compression molded at 190°–230° C. and drawn at room temperature to a strong oriented film or fiber. The nitrate ester derivatives are also useful as components of explosives, propellants and as coatings.

To better understand the present invention, and not by way of limitation, attention is directed to the following examples.

EXAMPLES I–X

High molecular weight, linear PHO was synthesized by polymerizing the trimethylsilyl ether of HO (10 ml basis) with a coordination catalyst ($Et_3Al-0.5\ H_2O-0.5$ acetylacetone) or, preferably, with the cationic $i-Bu_3Al-0.7\ H_2O$ catalyst (See: 2–4, Table I) followed by the hydrolysis of the trimethylsilyl group at 65° C. in 200 ml of toluene and 1 M HCl for a period of time. The toluene was evaporated and the resulting solution dialyzed and freeze dried. The major product was water soluble. The highest inherent viscosity (3.6) was obtained at $-78°$ with the $i-Bu_3Al-0,7\ H_2O$ catalyst which is consistent with this system being a cationic polymerization. The $^{13}C$-NMR for this material shows the expected two peak spectrum with no evidence for any measurable end groups such as were found in the low molecular weight spontaneous PHO. The $^1H$-NMR tacticity method on all the water soluble PHO products (with both the coordination and the cationic catalyst, (1–4, Table I) indicate that the products are atactic with the percent of isotactic dyads ranging from 44 to 52.

In many of the polymerizations conducted in connection with the present invention and summarized in Table I, below, small amounts (0.4–1.5%) of water insoluble polymer were isolated which have enhanced isotacticity (73–82%). As reported by Vandenberg, (*J. Polym. Sci.,* supra) low molecular weight isotactic PHO was prepared from the KOH initiated polymerization of S-glycidol. A repetition of this work showed that this isotactic PHO has a DP of 22, a melting point of 149° C. (DSC first heat), and is highly branched averaging two branches per chain. The extensive branching is reasonable for the base catalyzed polymerization method and complies with high branching results obtained with other base-catalyzed polymerizations of glycidol.

One water-insoluble PHO fraction with enhanced isotacticity (See: 1, Table I) was purified by boiling water-extraction and established as being 80% isotactic with a mp of 223° C. and $\Delta H_f = 25.6$ cal/g. This fraction is high molecular weight and linear. Thus, pure, linear isotactic PHO is quite high melting.

Representative polymerization of 3-(trimethylsilyloxy)oxetane (identified as Examples I through X, inclusive) are shown in Table I below.

TABLE I

Polymerization of 3-(trimethylsilyloxy)oxetane

| | Catalyst[b] | | Time | Temp. | Isolated PHO[a] | | | | | | |
|---|---|---|---|---|---|---|---|---|---|---|---|
| | | | | | Insoluble | | Soluble | | | | |
| No. | type | mmol | (hrs) | (°C.) | conversion (%) | % isotactic | Conversion (%) | $\eta_{inh}$ (dl/g) | % isotactic | mp (°C.) | $\Delta H_f$[c] cal/g |
| I | $Et_3Al-0.5H_2O-0.5AA$ | 2.86 | 192 | 65 | 1.5 | 73[d] | 53.5 | 0.34 | 50[e] | 154 | 16.1 |
| II | $iBu_3Al-0.7H_2O$ | 1.83 | 21 | 0 | 0 | | 79.0 | 1.09 | 52[e] | 155 | |
| III | $iBu_3Al-0.7H_2O$[f] | 1.85 | 22 | 0 | — | | 67.0 | 1.03 | 48[e] | 154 | 15.7 |
| IV | $iBu_3Al-0.7H_2O$[f] | 8.7[g] | 44 | −78 | 0 | | 49.2 | 3.04 | 44[e] | 141 | 11.4 |
| V | $Et_2Zn-0.5$ resorcinol | 3.87[h] | 55 | 25 | — | | <1 | — | 71[e] | | |
| VI | $Et_2Zn-0.9H_2O$ | 3.97[i] | 47 | 0 | — | | 13.4 | — | 49[e] | | |

TABLE I-continued

Polymerization of 3-(trimethylsilyloxy)oxetane

| | Catalyst[b] | | Time | Temp. | Isolated PHO[a] | | | | | | |
|---|---|---|---|---|---|---|---|---|---|---|---|
| | | | | | Insoluble | | Soluble | | | | |
| No. | type | mmol | (hrs) | (°C.) | conversion (%) | % isotactic | Conversion (%) | ηinh (dl/g) | % isotactic | mp (°C.) | ΔH$_f$[c] cal/g |
| VII | Et$_3$Al-0.5H$_2$O-0.5AA-1.0t-BuOH | 8.04[j] | 305 | 65 | 0.7 | 81[d] | 4.8 | — | | 165 | 8.6[k] |
| VIII | Et$_3$Al-0.5H$_2$O-0.5AA-0.5 Binapthol | 3.95 | 36 | 65 | — | 82[d] | 16.6 | — | 53[e] 46[d] | 166 | 15.0 |
| IX | Et$_3$Al-0.5H$_2$O-0.5AA-0.5MeOH | 8.0 | 129 | 65 | 0.5 | | 7.1 | — | 56[e] 54[d] | | |
| X | Et$_3$Al-0.5H$_2$O-0.5AA-1.0MeOH | 8.0 | 264 | 65 | 0.4 | | 0.8 | — | | | |

[a]Data is for hydrolyzed polymer as described in the experimental section.
[b]AA = acetylacetone. No added diluent unless otherwise noted.
[c]Reported values are for 1st heat unless otherwise stated.
[d]Determined in 2:1 trifluoroacetic acid-d/trifluoroacetic anhydride.
[e]Determined in D$_2$O.
[f]50 mL toluene used as diluent
[g]Added in two equal portions at 0 and 20 h.
[h]Added in two equal portions at 0 and 26.5 h.
[i]Polymerization shaken for 21 h at 25° C. and remainder of time was tumbled at 65° C.
[j]Added in two equal portions at 0 and 18 h.
[k]2nd heat.

EXAMPLE XI

PHO made pursuant to the present invention with the i-Bu$_3$Al-0.7 H$_2$O cationic catalyst was found to have the following spectral properties: $^1$H-NMR (D$_2$O): σ4.05(m,CH), 3.65,3.54(ABX,J$_{AB}$=10.9 Hz, J$_{AX}$=4.0 Hz, J$_{BX}$=6.8 Hz, isotactic CH$_2$), 3.62, 3.58(ABX, J$_{AB}$=10.9 Hz, J$_{AX}$=4.2 Hz, J$_{BX}$=6.7 Hz, (syndiotactic CH$_2$); $^1$H-NMR (DMSO-d$_6$) σ4.73(d,J=4.7 Hz,1H,OH), 3.69(m,1H,CH), 3.37,3.31(ABX, J$_{AB}$=10.3 Hz, J$_{AX}$=4.7 Hz, J$_{BX}$=5.9 Hz); $^{13}$C-NMR (D$_2$O): σ71.70(CH), 74.93(CH$_2$).

In addition, PHO had an n$_{inh}$ of 1.03–3.04 in H$_2$O and was found to be atactic by $^1$H-NMR in D$_2$O. No hydroxyl end groups were detectable by $^1$H-NMR in DMSO-d$_6$, which is consistent with a high molecular weight, linear polymer. DSC: 1st heat, m.p.=155° C., ΔH$_f$=17.3 cal/g, 2nd heat, m.p.=148° C., ΔH$_f$=13.4 cal/g. Films of the PHO could be melt pressed at 190°–230° C. to give slightly turbid flexible films which could easily be oriented by cold-drawing at room temperature. Best results were obtained by melt pressing the polymer at 190°, thoroughly drying the film under vacuum (0.1 mm Hg) at 60°–70° C. for 45 min, and then repressing the dry film at 190°. Films of PHO as well as the freeze-dried polymer were extremely hygroscopic, both absorbing 12–14% water within a few hours at 100% relative humidity at 25° C. The freeze-dried polymer was found to absorb water very rapidly for about 1 day after which it gained weight more slowly. After 30 hours at 100% humidity, freeze-dried PHO absorbed 50% by weight of water. Consistent with this highly hydrophilic nature, 2% aqueous solutions of PHO do not precipitate at 150° C. in a sealed tube, in contrast to the behavior of many water-soluble polyethers which precipitate at lower temperatures.

PHO, (n$_{inh}$ 1.2) had a density of 1.324 gm/ml at 25° C. after grinding cryogenically and drying four hours at 80° C. in oil pump vacumm. This data was determined with an air comparison pycnometer (Beckman Model 930) using helium.

Glass transition ("T$_g$") and related data were determined at about 1 Hz using Gillham's "Torsional Braid Analysis (TBA) method" (See: *Developments in Polymer Characterization*, Vol. 3, J. V. Dawkins, Ed., Applied Science Publishers, Ltd., London, 1982, Chap. 5, p.159) under dry helium. In this test, a 10% aqueous solution of PHO was used to coat the braid, the sample was transferred to the TBA equipment and dried by heating under helium from 30° to 180° C. The cooling and heating cycles were then run in flowing dry helium at 1.5° C./min. The first cycle was from 180° to −180° to 200° C.; the second from 200° to −180° to 220° C.; and the third from 220° to −180° to 220° C. The first cycle indicated a T$_g$ of −5° C. and m.p. of 148° C. with other transitions indicated from the Log Decrement curve at −36° and 81° C. The second and third cycles were similar except that the hysteresis evident at the T$_g$ gradually disappeared completely in third cycle when the indicated T$_g$ was 16° C. This effect is no doubt due to the elimination of the last traces of water. The product produced hereby is high molecular weight, linear, atactic PHO.

EXAMPLE XII

Water insoluble PHO (6.6 mg), isolated from a Et$_3$Al-0.5 H$_2$O-0.5 AA catalyst polymerization (73% isotactic by $^1$H-NMR in 2:1 trifluoroacetic acid-d:trifluoroacetic anhydride) was fractionated further by stirring with 10 ml of distilled water at 100° C. for 90 minutes. The solid was centrifuged out, washed with two 10 ml portions of distilled water and then dried overnight under vacuum (<0.2 mm Hg) to give 4.2 mg of white papery material. The combined supernatant and washings were then freeze-dried to give 2.4 mg of water soluble material which also had a papery appearance. $^1$H-NMR in 2:1 trifluoroacetic acid-d:trifluoroacetic anhydride gave normal PHO CH decoupled spectra and showed the water soluble and insoluble fractions to be 63% and 80% isotactic, respectively. The water insoluble material had: DSC: ΔH$_f$=25.6 cal/g (1st heat) and m.p.=223° C.; x-ray gave a crystalline peak at 3.97 with much amorphous (same major peak as previously reported by Vandenberg in *J. Polym. Sci.*, supra). This product is high molecular weight, linear, isotactic PHO.

EXAMPLE XIII

High molecular weight linear PHO, prepared from the polymerization of 3-(trimethylsilyloxy) oxetane (10 ml basis) to poly[3-(trimethylsilyloxy)oxetane] using the catalysts shown in Examples I-X above and condition shown in Table I, which was then hydrolyzed to PHO by tumbling at 65° with 200 ml of toluene and 300 ml of 1 M HCl for about 24 hours. The toluene was evaporated under a stream of nitrogen or via aspirator vacuum and the resulting aqueous solution dialyzed neutral using 2000 molecular weight cut-off dialysis tubing. The resulting solution was freeze-dried in vacuo (<0.1 mm Hg). $^{13}$C-NMR is a simple two peak spectra for the $CH_2$ and CH chain carbons and confirms that the polymer is high molecular weight with no detectable end groups such as are found in large amounts in the prior art polymers.

EXAMPLE XIV

The high molecular weight branched PHO was synthesized by filling a capped tube with a mixture of NaH (10.9 mg, 0.27 mmol) as a 60% dispersion in mineral oil and 101 mg (1.36 mmol of HO units) of dry linear, high molecular weight PHO having an inherent viscosity of 1.0. The tube was then flushed with an inert atmosphere of dry nitrogen and 2.0 ml DMSO was injected. The mixture was then stirred magnetically for 29 hours, and 18.1 μl (0.27 mmol) of glycidol was rapidly introduced. After stirring an additional 56 hours, analysis by $^1$H-NMR revealed little grafting had taken place. An additional 36.2 μl (0.55 mmol) of glycidol was then added and the mixture was stirred for an additional 63 hours, washed into a dialysis tube with 30 ml of distilled water, and dialyzed five times with 20 L portions of distilled water. The resulting solution was extracted once with 25 ml $CH_2Cl_2$ and freeze dried to give 107 mg of papery white material DSC: 1st heat, broad melt 75°–142° C., peak at 118° C., $\Delta H_f$ (Heat of Fusion)=14 cal/g; 2nd heat, broad melt 91°–134° C., peak at 123° C., $\Delta H_F$=7 cal/g. X-ray spacings, Å (rel-intensity): 3.97(100), 6.21(50). These x-ray data are similar to the starting linear PHO except the strongest peak is broader.

$^1$H-NMR of the high molecular weight branched PHO in DMSO-$d_6$ is shown in FIG. 2 and reveals two hydroxyl resonances (peaks c and d), the chemical shift of which matched that of the hydroxyl end groups found previously for low molecular weight/branched PHO. These end groups for this branched polymer are all due to branches since the starting PHO had neglible end groups based on its high molecular weight. In addition to these hydroxyls, two other peaks (peaks e and f) of about 300% greater intensity were found. These peaks are presumably due to single glycidol units joined to the PHO backbone after nucleophilic attack of the PHO oxyanion on the C3 carbon of glycidol.

Peak b is presumably a hydroxyl attached to the first unit of a long chain branch since this is the only type of hydroxyl unaccounted for if it is assumed that the branch polymer has the structure shown, (FIG. 2). Thus, in this example, total branched end group units:- total units=

$$\frac{e + c}{2(e + b) + 1} = 0.087$$

using c:e:b:main chain OH=0.0213:0.0836:0.0174:1.00.

EXAMPLE XV

High molecular weight PHO prepared according to Example II was readily compression molded at 200° C. to a slightly cloudy film. This film was readily oriented and its strength greatly enhanced by cold drawing at room temperature. PHO is quite hydrophilic and absorbs water from the atmosphere very readily, e.g., 12–14% in a few hours at 100% relative humidity at 25° C. Also 2% water solutions of high molecular weight PHO do not precipitate on heating in a sealed vessel to 150° C. which further demonstrates the hydrophilicity of PHO because most water-soluble polyethers precipitate from water at 30°–100° C. The density of PHO is 1.32 at 25° C.

From the foregoing, it is readily apparent that the invention herein described fulfills all of the aforestated objectives in a remarkably unexpected fashion. It is of course understood that such modifications, alterations and adaptations as may readily occur to an artisan having the ordinary skills to which this invention pertains are intended within the scope of the present invention which is limited only by the scope of the claims appended hereto.

Accordingly, what is claimed is:

1. The process of preparing high molecular weight branched poly(3-hydroxyoxetane) polymer comprising introducing into a sealed reactor vessel containing an inert atmosphere, a dry linear poly(3-hydroxyoxetane) having an inherent viscosity (0.1% in water at 30° C.) greater than 0.5, adding to said vessel a solvent and dispersion of NaH in an inert carrier; stirring the mixture until the poly(3-hydroxyoxetane) is thoroughly mixed therewith, adding glycidol to the stirred mixture and continue stirring until the reaction is complete and the branched polymer is formed; dialyzing said branched polymer to remove water solubles therefrom, and collecting the branched polymer.

2. High molecular weight branched poly(3-hydroxyoxetane) having a crystalline microstructure and a weight average molecular weight greater than 25,000.

* * * * *